United States Patent

Swartzlander et al.

[11] Patent Number: 5,851,007
[45] Date of Patent: Dec. 22, 1998

[54] ENGINE TEST STAND KIT

[76] Inventors: Kenneth R. Swartzlander, 450 Harding Rd., Corona, Calif. 91719; Dean A. Woodruff, 6947 Mesada St., Alta Loma, Calif. 91701

[21] Appl. No.: 753,187

[22] Filed: Nov. 21, 1996

[51] Int. Cl.$^6$ .................................................. B23Q 3/00
[52] U.S. Cl. ................................ 269/17; 269/16; 269/56; 269/22
[58] Field of Search .................................. 269/17, 16, 95, 269/289 MR, 318; 29/273; 254/133 R, 134

[56] References Cited

U.S. PATENT DOCUMENTS

| | | | |
|---|---|---|---|
| 1,481,503 | 1/1924 | Carswell et al. | |
| 1,812,585 | 6/1931 | Collins | 269/17 |
| 2,446,518 | 8/1948 | Arnold et al. | |
| 2,627,109 | 2/1953 | Bock et al. | |
| 2,741,830 | 4/1956 | Lewis | 269/17 |
| 2,825,477 | 3/1958 | Ross | |
| 3,194,525 | 7/1965 | Webb | 269/17 |
| 3,381,953 | 5/1968 | Miller | |
| 4,461,447 | 7/1984 | Gottiob | |
| 4,533,127 | 8/1985 | Hawkins | |
| 4,809,963 | 3/1989 | Kelly | |
| 4,848,717 | 7/1989 | Bevill | |
| 4,932,628 | 6/1990 | Pacheco | |

*Primary Examiner*—James G. Smith
*Assistant Examiner*—Lee Wilson
*Attorney, Agent, or Firm*—Harold L. Jackson

[57] ABSTRACT

A universal test stand kit for supporting an internal combustion engine during tests includes a pair of side frame members having upper and lower pieces joined together by end pieces and laterally extending tubular stubs. The side frame members are joined together by tubular crosspieces telescopically received in the tubular stubs. A forward engine support assembly is slideably mounted on each side frame member so that the assemblies can be moved longitudinally to accommodate different sizes of engine. Each forward support assembly includes an elongated track which is laterally moveable and provided with apertures for receiving bolts which may be threaded into tapped bores in the engine block from which oil pan bolts have been removed. A rearward engine support assembly is mounted on the side frame members so that the assembly can be aligned with the rear end of the engine to be tested. The test stand may be readily shipped in a standard shipping container in its disassembled condition and can be readily assembled when received at its destination.

23 Claims, 4 Drawing Sheets

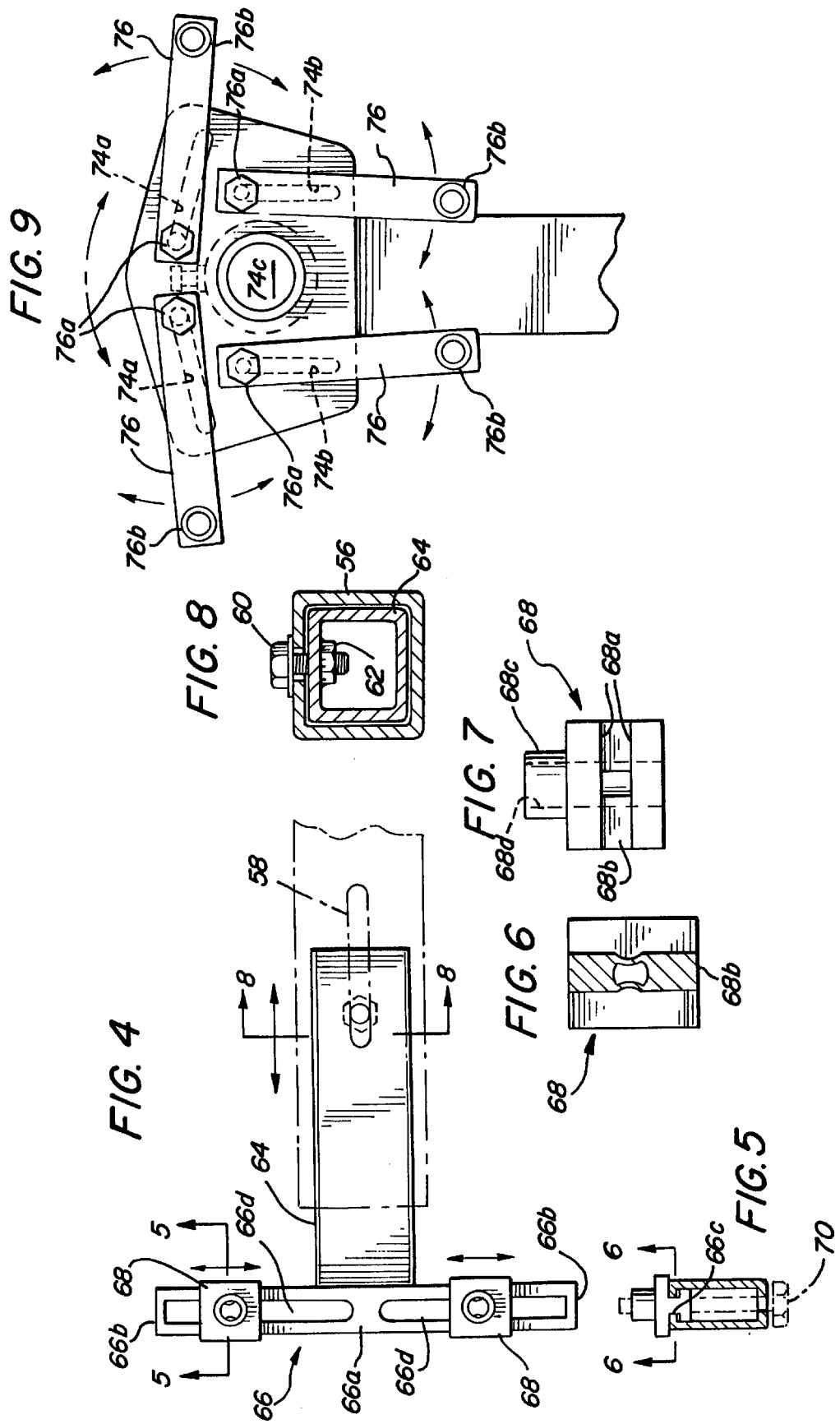

ENGINE TEST STAND KIT

FIELD OF THE INVENTION

This invention relates to engine test stands and more particularly to a universal engine test stand kit which in it's disassembled condition may be readily shipped in a standard shipping container and readily assembled when received at its destination, into a sturdy, durable and portable stand for testing a wide variety of internal combustion engines.

DESCRIPTION OF THE PRIOR ART

Various types of test stands have been and are currently being used to allow a mechanic to test a new or rebuilt engine before it is installed in a vehicle. Such stands allow the mechanic to insure that the engine is functioning properly, thereby eliminating the time involved in having to remove a malfunctioning engine after installation in the vehicle. Such test stands are generally made up of structural members welded together at or near the testing site. The effort involved in welding one of a kind test stands is considerable and therefore costly for a garage or other engine rebuilding facility.

Several types of engine stands, some of which are suitable for testing purposes, are described in U.S. Pat. Nos. 4,932,628 ("'628 patent"); 4,461,447; 4,533,127; 2,627,109; 3,381,953; 4,848,717 ("'717 patent"); 4,809,963; 2,825,477 and 1,481,503. The '717 and '628 patents disclose stands arranged to allow an engine to be tested thereon.

Such stands are limited as to their adjustability to support different sizes and makes of engines. The stand in the '717 patent is also described as being easily assembled and disassembled. However, in each of the stands described in the '717 and '628 patents, a single base member is used to support upstanding posts which in turn support the engine in such stands. Such an arrangement requires large structural members to provide a stable platform during testing procedures.

There is a need for a simple, stable and durable universal engine test stand which can be readily shipped in its disassembled condition in a standard shipping carton and readily assembled at the receiving site.

SUMMARY OF THE INVENTION

A universal test stand kit, in accordance with the present invention, includes a pair of side frame members with each member defining a rectangular section. Each side frame member includes an elongated upper and a lower piece joined together by end pieces and three lateral tubular stubs which extend inwardly and at right angles to the plane of the frame member. The lower piece preferably extends beyond the upper piece to provide support for the rearward section of an engine and a shelf for holding engine performance gauges and tools in lieu of extending both the upper and lower pieces for this purpose.

A forward engine support assembly is slidably mounted on the upper and lower pieces of each side frame member so that the assemblies can be moved longitudinally to accommodate different sizes of engines. Each forward engine support assembly preferably has a separate collar slidably received over the upper and lower pieces of the respective side frame member, a tubular stud extending inwardly and at right angles to the upper piece and a brace extending from the tubular stud to the lower collar. Each forward engine support assembly preferably further includes a forward engine support arm adapted to be telescopically received in the tubular stub and an elongated track at the free end thereof. A pair of apertured engine block engaging members are slidably received in the track with the aperture adapted to receive vertically oriented bolts which may be threaded into tapped bores in the engine block such as the holes into which the oil pan bolts are normally received.

A tubular crosspiece is adapted to be telescopically received in each tubular lateral stud of the side frame members to form an open parallelepiped frame section in the assembled condition. A rearward engine support assembly is adapted to be slidably mounted on the lower piece of each side frame member so that the assembly may be moved forward and backward to be aligned with the rearward portion of different sizes of engines.

The rearward engine support assembly preferably includes a headpiece having a rearwardly extending stub portion and pivotally mounting a plurality of pivotally mounted arms carrying legs on the free ends thereof. The legs are provided with longitudinal bores therethrough for receiving bolts adapted to be threadably received in tapped holes in the rearward section of the engine. A subassembly mounts the headpiece to the lower pieces of the side frame members. Such subassembly preferably includes (1) a pair of tubular rearward lateral support arms slidably mounted on the lower pieces of respective side frame members via collars; (2) a T-shaped member with laterally extending legs adapted to be telescopically received in the lateral support arms and an upstanding tubular post; and (3) a headpiece mounting member having a tubular receptacle for telescopically receiving the stub portion of the head piece and a downwardly extending tubular support member arranged to be telescopically mounted on the upstanding tubular post.

A tool and instrument housing support tray assembly may be adapted to be mounted at the rear portion of the side frame members for holding a mechanic's tools and for supporting a housing containing various instruments or gauges useful in monitoring an engine's performance during tests.

The test stand may also be provided with a radiator and fuel tank supported on the front crosspieces and a bracket for supporting a battery on the rear crosspiece.

The test stand kit of the present invention and the features thereof will be best understood by reference to the following description taken in conjunction with the accompanying drawings where like components are given the same reference numeral.

BRIEF DESCRIPTION OF THE DRAWINGS

FIG. 4 is a top plan view of the forward engine support arm subassembly;

FIG. 5 is a cross-sectional view taken along lines 5—5 of FIG. 4 showing one of the engine block engaging members seated in the track portion of the engine support arm subassembly and with a bolt inserted therethrough to be threadably received in a tapped hole in the engine block;

FIG. 6 is a bottom cross-sectional view of one of the engine block engaging members taken along line 6—6;

FIG. 7 is a side elevation view of one of the engine block engaging members;

FIG. 8 is a cross-sectional view taken along lines 8—8 of FIG. 4 illustrating the manner in which various adjustable telescoping sections are secured together;

FIG. 9 is a front elevational view of the rearward engine support headpiece; and FIG. 10 is a cross-sectional view taken along lines 10—10 of FIG. 1 showing the manner in which the nonadjustable telescoping members are secured.

DESCRIPTION OF THE PREFERRED EMBODIMENT

Figure 1:
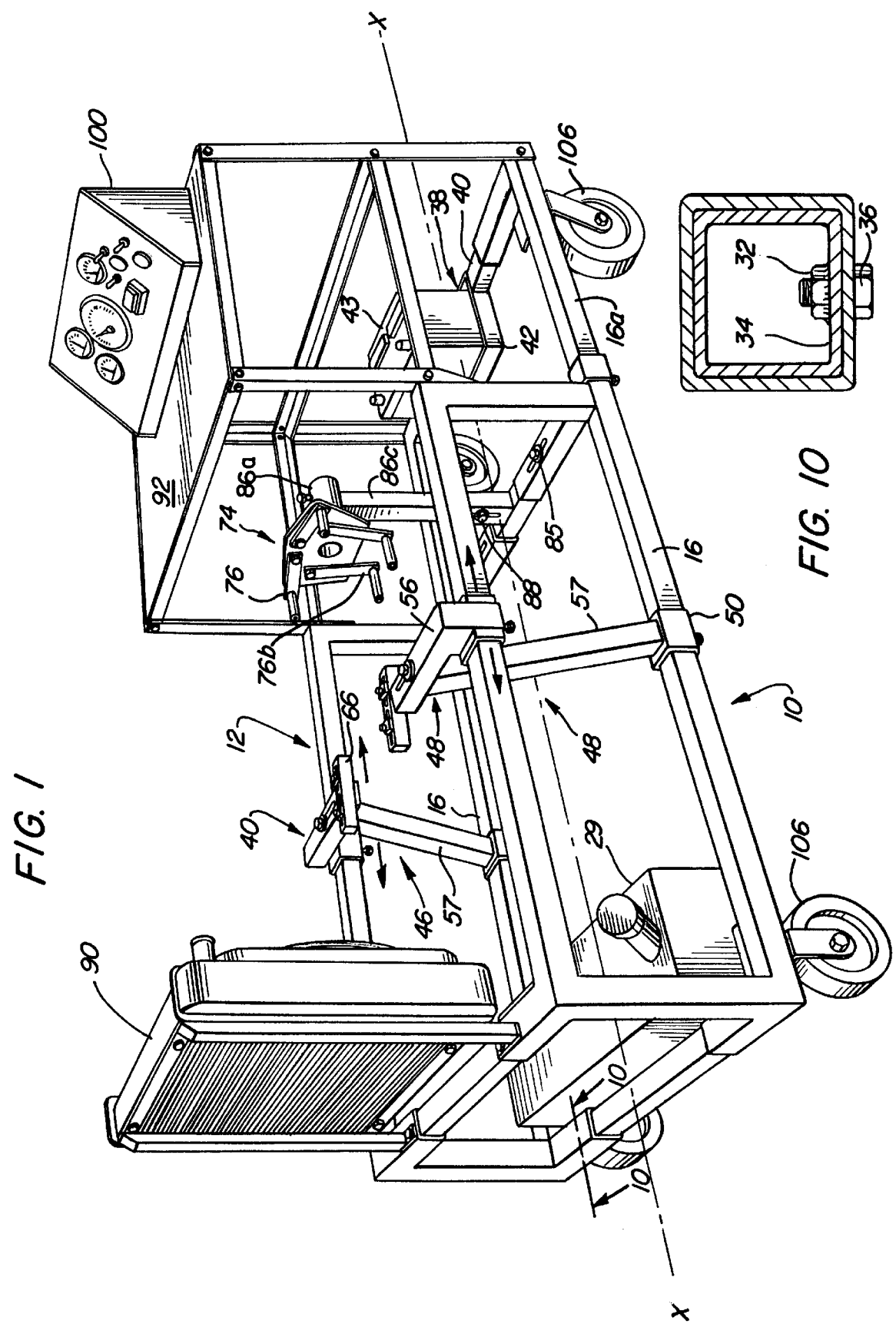
FIG. 1 is a perspective view of an engine test stand kit of the present invention in the assembled condition.
Figure 2:
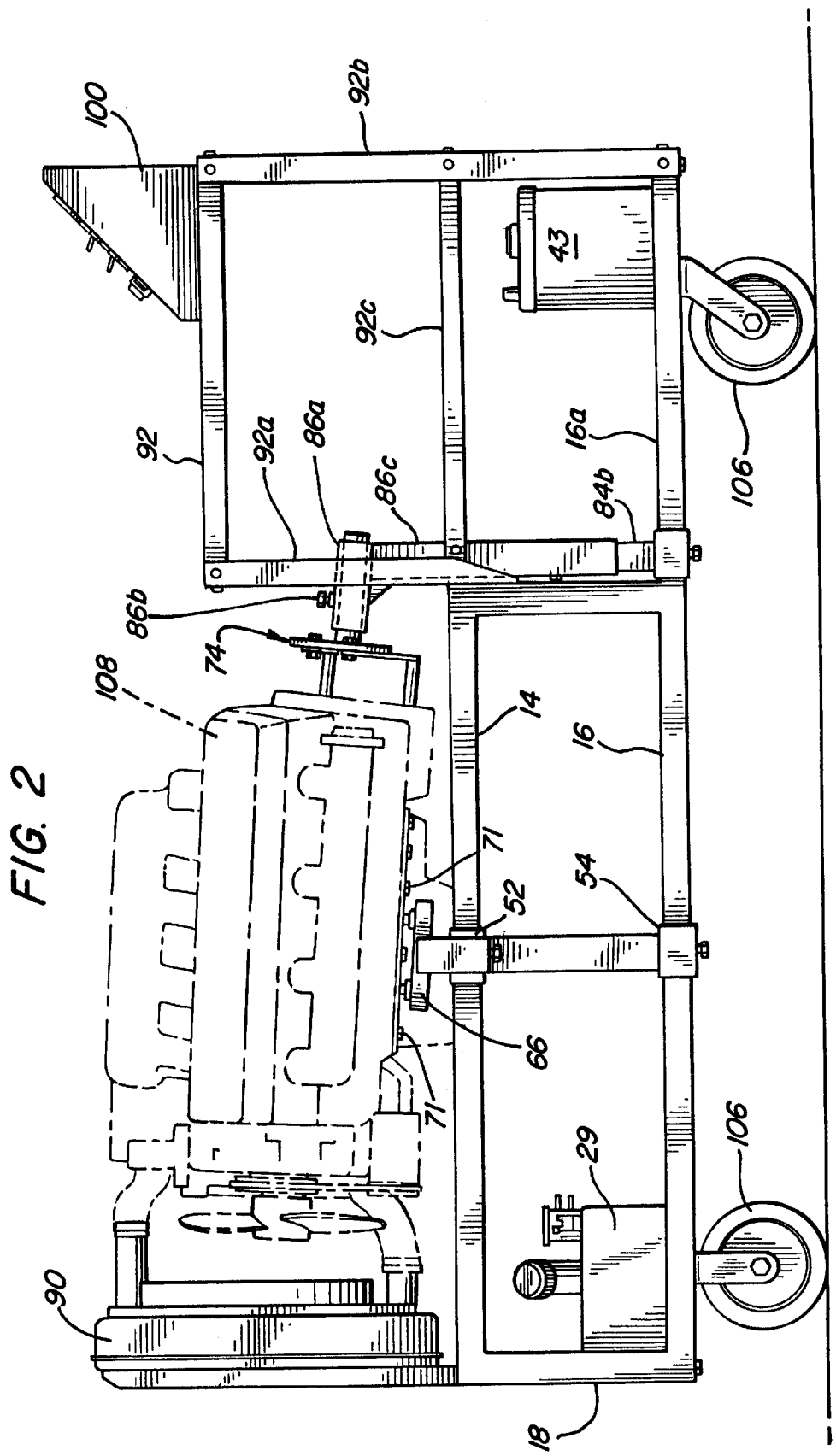
FIG. 2 is a side elevational view of the test stand kit of FIG. 1 with an installed engine.
Figure 3:
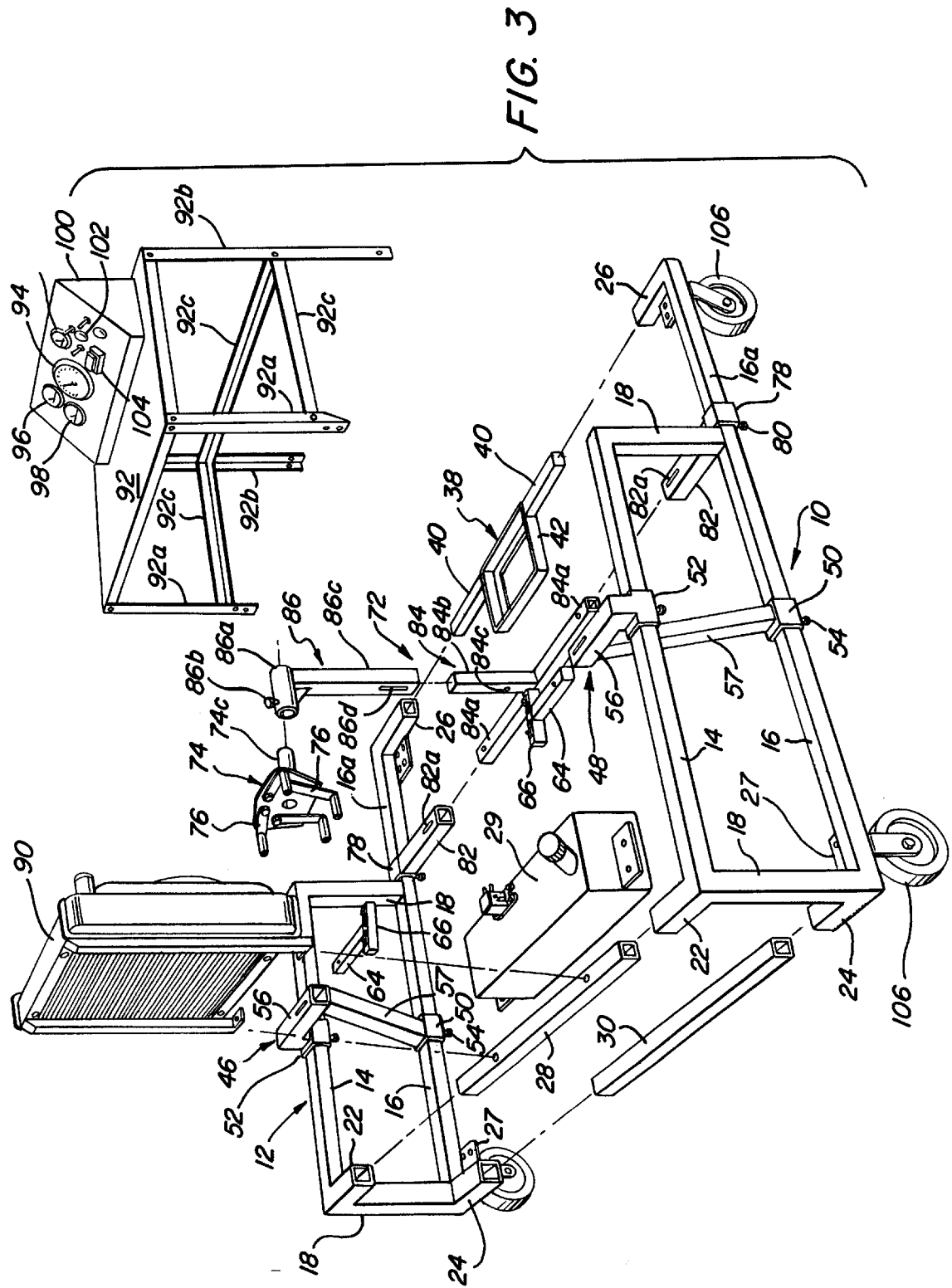
FIG. 3 is an exploded perspective view of the test stand kit of FIG. 1 in the disassembled condition.

Referring now to the drawings and particularly to FIGS. 1–3 the universal engine test stand of the present invention includes a pair of side frame members 10 and 12. Each side frame member has an upper and a lower piece designated 14 and 16, respectively. The upper and lower pieces are preferably tubular with a square cross section and are joined together by square tubular end pieces 18 to form a rectangular section lying in a substantially vertical plane parallel to the longitudinal axis x—x of the stand in the assembled condition as is illustrated in FIG. 1.

The lower piece 16 of each side frame member includes an extension 16a which projects rearwardly beyond the upper piece 14 to support a rearward engine support assembly and to accommodate a tool and instrument tray assembly as will be described in more detail.

Each side frame member further includes three tubular stubs 20, 22 and 24 extending inwardly and at right angles to the plane of the respective side frame member. As illustrated, the stubs 22 and 24 are joined to the front corners of the side frame members and stub 26 is joined to the terminal end of the lower piece extension 16a. The side frame members are preferably made of steel with the end pieces welded to the respective upper and lower pieces. A fuel tank supporting bracket 27 is suitably secured to the front of the lower pieces of each side frame member for supporting a tank 29 for holding fuel for the engine to be tested as will be explained later.

A pair of forward tubular crosspieces 28 and 30 are adapted to be telescopically received in the tubular lateral stubs 22 and 24, respectively. Holes are provided in the bottom walls adjacent the free ends of the crosspieces and the lateral stubs for receiving bolts therethrough in the assembled condition. A nut 32 is suitable secured (as by welding) to the bottom wall 32 of the crosspieces above the holes. See FIG. 10. Bolts 36 are threaded into the nuts to secure the crosspieces to the side frame members and provide a stable platform for supporting an engine to be tested.

The tubular free ends 40 of the third crosspiece 38 are adapted to be telescopically received in the rearward stubs 26. The rear crosspiece 38 is secured to the stubs 26 via an arrangement of bolts and nuts as previously explained with respect to crosspieces 28 and 30 and the associated stubs. It should be noted that a battery shelf 42 is carried by the rear crosspiece 38 for receiving a battery 43 (FIG. 1).

The forward end of an engine to be tested is supported by a pair of forward engine support assemblies 46 and 48. Each assembly includes a bracket having a lower collar 50 and an upper collar 52 slidably mounted on the lower and upper pieces of the associated side frame members, respectively, as is illustrated in FIG. 1. A headed set screw 54 is threaded into a tapped hole in the bottom of each collar and engages the bottom of the respective upper and lower pieces of the side frame members as shown. Each bracket includes a tubular stud 56 having, for example, a square cross section extending inwardly from the respective upper collar at right angles to the plane of the respective side frame member as shown. A brace 57 extends between each lower collar 50 and the stub 56 adjacent the distal or free end thereof as shown. The upper wall of each stub 56 is slotted at 58 adjacent the free end thereof for receiving a bolt 60 which is threadably received in a nut 62 secured to the inner surface of the proximal end of a tubular forward engine support arm 64 forming part of the support assembly. The mounting end of each support arm 64 is telescopically received in the stub 56 of a respective bracket 46 and 48. The slots 58 permit the support arms to be adjusted laterally with respect to the respective side frame members The distal end of each support arm 64 carries an elongated track member 66 in the form of a rectangular cage open along the bottom and the top (except for a center strut 66a) with closed ends 66b. See FIG. 5. The top of each track member 66 includes a pair of inwardly projecting shoulders 66c which form slots 66d therebetween separated by the center section 66a, is shown in FIG. 4. An engine engaging block member 68 is slidably mounted in each end of each track member 66 prior to the closure of the ends thereof. The block engaging members include a pair of outwardly projecting shoulders 68a which extend beyond each side of the shoulders 66c of the track member 66 so that the block engaging members are free to slide longitudinally within the slots 66d with the rectangular central portions 68b riding in the slot 66d. Each block engaging member further includes a cylindrical upstanding post 68c and a generally vertically aligned opening 68d extending therethrough to receive a bolt 70. The bolts 70 are adapted to be threadably received in tapped holes in the block of an engine to be tested. The tapped holes are normally occupied by bolts 71 (FIG. 2) which secure the oil pan in place.

The upper surfaces of the posts 68c extend above the upper surface of the track member 66 a sufficient distance to prevent the nonremoved pan bolts 71 from contacting the track member 66 and preventing the block engaging members from transferring the weight of the engine to the track members. It should be noted that each forward engine support assembly includes a respective support bracket (components 50, 52, 56 and 57), a support arm 64 and a track member 66.

A rearward engine support assembly includes a headpiece 74 in the form of a plate with two opposed generally horizontal slots 74a, two spaced generally vertical slots 74b and a rearwardly extending cylindrical stub 74c. An elongated rearward engine support arm 76 is pivotally and slidably mounted in each of the slots 74a and 74b via suitable bolts 76a (and nuts not shown). See FIG. 9. The free end of each arm 76 carries an elongated hollow cylindrical leg 76b through which bolts (not shown) may be inserted to be threadably received in tapped holes (not shown) in the rearward portion of the engine. The headpiece 74 is slidably supported on the lower piece extension 16a of each side frame member by means of a subassembly comprising a pair of collars 78 slidably mounted on the extensions 16a of respective lower pieces of each side frame member as is illustrated in FIG. 3. Headed set screws 80 are threaded into tapped holes in the lower wall of each collar 78 for engaging the lower wall of the respective extensions 16a to maintain the collars at a desired position on the lower piece extensions. A tubular rearward lateral support arm 82 is carried by each collar 78 and extends at right angles to the plane of the respective side frame member. Each support arm 82 includes a slot 82a in the upper wall adjacent the free end thereof. The headpiece support subassembly further includes a T-shaped member 84 having laterally extending tubular member defining leg sections 84a adapted to be telescopically received in the lateral support arms 82. A hole is drilled in the upper wall of leg sections 84a adjacent the free end thereof and a nut (like the nut 62 of FIG. 8) secured to the underside of this upper wall below the hole. Bolts 85 are threaded through the slots and into the nuts to secure the leg sections 84a to the support arms 82 in the assembled condition. The slots 82a permit the T-shaped member to be moved laterally toward one side frame member and away from the other one and visa versa.

A tubular receptacle 86 completes the headpiece support subassembly. The receptacle 86 includes an upper sleeve 86a for telescopically receiving the post 74c of the headpiece 74. A headed set screw 86b threaded into a tapped hole in the sleeve for engaging the outer surface of the post 74c, holds the headpiece in a desired position relative to the receptacle 86. The sleeve 86a is mounted on the top of a downwardly extending tubular support member 86c which is arranged to be telescopically mounted on the upstanding post 84b. The support member 86c is slotted at 86d near its free end. The post 84b is provided with a hole 84c. A nut arrangement like that shown in FIG. 8, and a bolt 88 (FIG. 1), secures the sleeve 86c at a desired height on the post 84b.

All of the tubular sections preferably have a square cross-section and are made of a high strength material such as steel.

A radiator 90 is adapted to be mounted on the upper front crosspiece 28 via suitable bolts (not shown). A tool and instrument support housing tray 92 is mounted to the rear end pieces 18 and the lower piece extension 16a via upstanding angle sections 92a and 92b and suitable bolts (not shown). Lateral support sections 92c are suitably secured to the upstanding sections 92a and 92b as shown. Instruments for measuring various operating parameters of an engine under test such as an RPM meter 94, an oil pressure gauge 96, a temperature gauge 98 and an ammeter 99 are mounted in an instrument housing 100. The housing 100 may also contain an ignition key 102, various switches and a warning light 104.

Wheels 106 are mounted under the corners of each of the side frame members to allow the test stand to provide mobility.

The test stand kit is arranged to fit into a standard shipping carton in it's disassembled condition. At the receiving site the test stand may be readily assembled by inserting the free ends of the crosspieces 28, 36 and 38 into the respective lateral stubs 22, 24 and 26 of the side frame members. At the same time the legs 84a must be inserted into the lateral arms 82 of the headpiece subassembly 72. The several bolts may then be tightened to secure the side frames together. The remainder of the test stand may then be assembled. A battery may be inserted on the bracket 42 to ready the stand for receiving an engine to be tested.

In the assembled condition the track member 66 and the headpiece 74 are aligned at a few degrees to the horizontal and vertical, respectively, to position an engine, designated 108 in FIG. 2, as it would normally be positioned in a vehicle, i.e., at a slight angle to the horizontal. A hoist (not shown) may be used to position an engine over the test stand. Each forward engine support track member 66 may be moved longitudinally via collars 50, 52 and laterally via telescoping members 64, 66 until the track members are located in a desired position under the engine crank case. The block engaging members are also moved longitudinally to line up with tapped holes in the engine block from which pan bolts have been previously removed. Bolts 70 are then inserted through the block engaging members as illustrated in FIG. 5 and threaded into the empty tapped holes to secure the forward end of the engine.

Each headpiece support subassembly may also be moved longitudinally along the respective lower piece extension 16a and laterally via telescoping tubes 82 and 84a. The rear support arms 76 may also be moved to align the legs 76b with tapped holes in the rear portion of the engine. Suitable bolts extending through the legs and into the tapped holes secure the rearward portion of the engine.

It should be noted that the engine need not be perfectly aligned along the longitudinal axis since each track member as well as the headpiece can be moved laterally.

There has thus been described a simple, inexpensive and durable engine test stand suitable for engines of many different sizes that can be readily shipped in its disassembled condition and easily assembled at the receiving site. Various additions and modifications to the preferred embodiment of the test stand described above will become obvious without involving any departure from the spirit and scope of the present invention as defined in the appended claims.

What is claimed is:

1. In a universal engine test stand kit adapted for easy assembly into an engine test stand for supporting an internal combustion engine during tests and having a longitudinal axis, a front end and a rear end, the combination comprising:

a) a pair of side frame members, each side frame member defining a rectangular section lying in a substantially vertical plane parallel to the longitudinal axis in the assembled condition, each side frame member including an upper and a lower horizontal piece joined together by end pieces, each side frame member further including first, second and third tubular lateral stubs extending inwardly and generally at right angles to a plane defined by the side frame member;

b) a pair of forward engine support assemblies adapted to support the front section of an engine during tests, each forward support assembly being slidably mounted on each of the upper and lower tubular pieces of a respective side frame member, whereby the forward engine support assemblies can be moved longitudinally along the side frame members to accommodate different sizes of engines;

c) a tubular crosspiece adapted to be telescopically received in each of the tubular lateral stubs of the side frame members whereby an open parallelepiped frame section is formed in the assembled condition; and d) a rearward engine support assembly adapted to be mounted on one of the upper and lower pieces of each of the side frame members, the rearward engine support bracket being arranged to move longitudinally relative to the side frame members in the assembled condition for accommodating different sizes of engines.

2. The engine test stand of claim 1 wherein the side frame members are tubular.

3. The engine test stand of claim 2 wherein the tubular side frame members have a generally square cross-section.

4. The engine test stand of claim 3 wherein the lower piece of each side frame member extends rearwardly beyond the upper piece, the first and second lateral stubs extending from the corners at the front of the rectangular sections and the third lateral stub extending from the rear end of the lower pieces.

5. The engine test stand kit of claim 2 wherein the engine includes a block with tapped holes in the forward section thereof for receiving bolts to secure an oil pan and each of the forward engine support assemblies comprises:

a forward support bracket having an upper collar slidably received over the upper tubular piece of a side frame member and a lower collar slidably received over a lower tubular piece of a side frame member;

a tubular stub extending inwardly from the upper collar and generally at a right angles to the upper piece of a respective side frame member in the assembled condition;

a brace extending from the stub to the lower collar;

a forward engine support arm including a tubular section having a proximal end adapted to be telescopically received in the tubular stub and distal end;

an elongated track supported on the distal end of the engine support arm, the track being oriented generally along the longitudinal axis of the test stand in the assembled condition; and a pair of engine block engaging members slidably supported on the elongated track, each block engaging member having a vertically oriented opening therein for receiving a bolt adapted to be threadably received in one of the tapped holes in the forward section of the engine block.

6. The test stand of claim 2 wherein the engine includes a plurality of tapped holes in the rearward section thereof and wherein the rearward engine support assembly comprises:

a headpiece with a rearwardly extending stub portion;

a plurality of arms adapted to be pivotally mounted on the head piece, each arm carrying a leg at the free end thereof, the legs having generally longitudinally aligned openings therein for receiving bolts adapted to be threadably received in the tapped holes in the rearward section of the engine; and a subassembly for mounting the headpiece to the lower pieces of the side frame members to allow the headpiece to move longitudinally and laterally with respect to the side frame members.

7. The test stand of claim 6 wherein the rearward engine support subassembly comprises:

a pair of tubular rearward lateral support arms slidably mounted on the lower pieces of respective side frame members;

a T-shaped member having laterally extending legs adapted to be telescopically received in the lateral support arms and an upstanding tubular post; and a tubular receptacle for telescopically receiving the stub portion of the headpiece, the receptacle being secured to a downwardly extending tubular support member, the support member being arranged to be telescopically mounted on the upstanding tubular post.

8. The test stand kit of claim 2 further including a radiator adapted to be mounted on the upper pieces of the side frame member.

9. The test stand kit of claim 8 further including a tool and instrument housing support tray assembly adapted to be mounted to the side frame members at the rear portion of the test stand, the tray assembly including a horizontally aligned tray in the assembled condition for supporting tools and an instrument housing.

10. The test stand kit of claim 9 further including an instrument housing adapted to be mounted on the rear portion of the tool tray.

11. The test stand kit of claim 10 further including a plurality of gauges mounted in the instrument housing for measuring various operational parameters of an engine under test.

12. The test stand kit of claim 11 further including a battery support bracket adapted to be mounted on the rear cross bar.

13. The test stand kit of claim 12 further including a wheel adapted to be mounted adjacent the corner of each of the lower pieces of the side frame members.

14. The test stand kit of claim 13 further including a fuel tank adapted to be mounted to the lower pieces of the side frame members.

15. In a universal engine test stand kit adapted for ease of shipment in the disassembled condition and for ease of assembly into an engine test stand for supporting a variety of internal combustion engines during operating tests thereon and having a longitudinal axis, a front end and a rear end, the combination comprising:

a) a pair of tubular side frame members, each side frame member defining a rectangular section lying in a substantially vertical plane parallel to the longitudinal axis in the assembled condition, each side from member including an upper and a lower horizontal piece joined by end pieces, each side frame further including first and second tubular lateral stubs extending inwardly from the front corners thereof and at least a third tubular lateral stub spaced rearwardly from the front end of the side frame members and extending inwardly from the lower piece;

b) a tubular crosspiece adapted to be telescopically received in each of the tubular lateral stubs to provide an open parallelepiped structure in the assembled condition;

c) means for securing the tubular crosspieces to the lateral stubs of the side frame members;

d) a pair of front end engine support brackets, each bracket having an upper collar adapted to be slidably received over the upper tubular piece of a side frame member and a lower collar adapted to be slidably received over the lower tubular piece of a side frame member, each engine support bracket further including a tubular stub extending inwardly from the upper collar and a brace extending from the stub to the lower collar, whereby the engine support brackets may be slidably moved along the side frame members;

e) a pair of front end engine bracket arms, each bracket arm including a tubular section having a proximal end adapted to be telescopically received in the tubular stub of one of the engine support brackets and a distal end carrying an elongated track extending at right angles to the tubular section;

f) a pair of engine block engaging members slidably supported on each of the bracket arm tracks, each block engaging member having a vertically oriented opening therein for receiving a bolt adapted to be threadably received in the engine block; and g) a rear engine support assembly adapted to be slidably mounted on the lower piece of each side frame member.

16. The engine test stand of claim 15 wherein the lower piece of each side frame member extends rearwardly beyond the upper piece and the third lateral stub extending from the rear end of the respective lower piece.

17. The test stand of claim 16 wherein the engine includes a plurality of tapped holes in the rearward section thereof and wherein the rearward engine support assembly comprises:

a headpiece with a rearwardly extending stub portion;

a plurality of arms adapted to be pivotally mounted on the head piece, each arm carrying a leg at the free end thereof, the legs having generally longitudinally aligned openings therein for receiving bolts adapted to be threadably received in the tapped holes in the rearward section of the engine; and a subassembly for mounting the headpiece to the lower pieces of the side frame members to allow the headpiece to move longitudinally and laterally with respect to the side frame members.

18. The test stand of claim 17 wherein the rearward engine support subassembly comprises:

a pair of tubular rearward lateral support arms slidably mounted on the lower pieces of respective side frame members;

a T-shaped member having laterally extending legs adapted to be telescopically received in the lateral support arms and an upstanding tubular post; and a tubular receptacle for telescopically receiving the stub portion of the headpiece, the receptacle being secured to a downwardly extending tubular support member, the support member being arranged to be telescopically mounted on the upstanding tubular post.

19. In a universal engine test stand kit for supporting a variety of internal combustion having tapped holes in the forward end of the block for receiving pan securing bolts and additional tapped holes in the rearward end of the block, the combination comprising:

a pair of tubular side frame members, each side frame member defining a rectangular section lying in a vertical plane with an upper and a lower end piece, the lower end piece extending longitudinally beyond and rearwardly of the upper end piece and terminating in a rear terminal end;

first, second, and third tubular crosspieces, the first and second crosspieces being connected between the respective front corners of the side frame members, the third crosspiece being connected between the rear terminal ends of the lower end pieces of the side frame members;

a pair of forward support brackets, each bracket having an upper collar slidably received over the upper tubular piece of a respective side frame member and a lower collar slidably received over a lower tubular piece of the side frame member, each bracket further including a tubular stub extending inwardly from the upper collar and generally at right angles to the upper piece of a respective side frame member, and a brace extending from the stub to the lower collar;

a pair of forward engine support arms, each arm including a tubular section having a proximal end adapted to be telescopically received in the tubular stub of a respective forward support bracket and a distal end;

a pair of elongated tracks, each track being supported on the distal end of a respective engine support arm, the track being oriented generally along the longitudinal axis of the test stand;

a pair of engine block engaging members slidably supported on the elongated track, each block engaging member having a vertically oriented opening therein for receiving a bolt adapted to be threadably received in one of the tapped holes in the forward section of the engine block; and a rearward engine support assembly slidably mounted on the lower pieces of each of the side frame members so that the support assembly is moveable longitudinally relative to the side frame members for accommodating different sizes of engines.

20. The test stand of claim 19 wherein the rearward engine support assembly comprises:

a headpiece with a rearwardly extending stub portion;

a plurality of arms adapted to be pivotally mounted on the head piece, each arm carrying a leg at the free end thereof, the legs having generally longitudinally aligned openings therein for receiving bolts adapted to be threadably received in the tapped holes in the rearward section of the engine; and a subassembly for mounting the headpiece to the lower pieces of the side frame members to allow the headpiece to move longitudinally and laterally with respect to the side frame members.

21. The test stand of claim 20 wherein the rearward engine support subassembly comprises:

a pair of tubular rearward lateral support arms slidably mounted on the lower pieces of respective side frame members;

a T-shaped member having laterally extending legs connected to the lateral support arms and an upstanding tubular post; and a tubular receptacle for telescopically receiving the stub portion of the headpiece, the receptacle being secured to a downwardly extending tubular support member, the support member being arranged to be telescopically mounted on the upstanding tubular post.

22. The test stand kit of claim 21 further including a tool and instrument housing support tray assembly adapted to be mounted to the side frame members at the rear portion of the test stand, the tray assembly including a horizontally aligned tray in the assembled condition for supporting tools and an instrument housing.

23. The test stand kit of claim 22 further including an instrument housing adapted to be mounted on the rear portion of the tool tray.

* * * * *